United States Patent [19]

Unnewehr

[11] Patent Number: 4,594,632
[45] Date of Patent: Jun. 10, 1986

[54] OVERVOLTAGE PROTECTION CIRCUIT FOR SYNCHRONOUS MACHINEROTOR

[75] Inventor: Lewis E. Unnewehr, Lima, Ohio
[73] Assignee: Lima Electric Co., Inc., Lima, Ohio
[21] Appl. No.: 602,349
[22] Filed: Apr. 20, 1984
[51] Int. Cl.⁴ .............................................. H02H 7/09
[52] U.S. Cl. ..................................... 361/33; 361/56; 361/91
[58] Field of Search ................ 361/20, 21, 33, 56, 361/91; 318/718

[56] References Cited

U.S. PATENT DOCUMENTS 3,381,195  4/1968  Hoffmann ............................ 318/718
4,323,942  4/1982  Hartman et al. ...................... 361/56

FOREIGN PATENT DOCUMENTS 1124781  6/1982  Canada ................................ 318/718
2716206  10/1978  Fed. Rep. of Germany ........ 361/20
0103143  9/1978  Japan ................................... 361/33
0661708  5/1979  U.S.S.R. ............................... 361/20
0678583  8/1979  U.S.S.R. ............................... 361/56

Primary Examiner—A. D. Pellinen
Assistant Examiner—Derek S. Jennings
Attorney, Agent, or Firm—Renner, Otto, Boisselle & Lyon

[57] ABSTRACT

The rotor of a brushless synchronous machine, such as an alternator exciter machine, includes a field winding and a rectifier for applying full wave rectified power to the field winding. To protect the rectifier from excessive inverse voltages when such voltages are induced in the field winding, for example during motor starting, alternator paralleling, etc., the present invention employs an excessive voltage sensor and a triggerable bypass circuit for bypassing such excessive inverse voltage from the rectifier when the sensor senses such excessive inverse voltage. The sensor preferably includes a solid state relay capable of assuming either of two output conditions, depending on the magnitude, and with a prescribed input circuit, the polarity, as well, of a voltage induced in the field winding. The bypass circuit includes a pair of triggerable switches, such as SCR's or triacs, which operate in response to the output from the relay effectively to short circuit the rectifier when an excessive inverse voltage occurs; and the SCR's preferably are self commutating to open the bypass circuit in response to a polarity change of the induced field winding voltage and/or a prescribed input to the rectifier.

32 Claims, 2 Drawing Figures

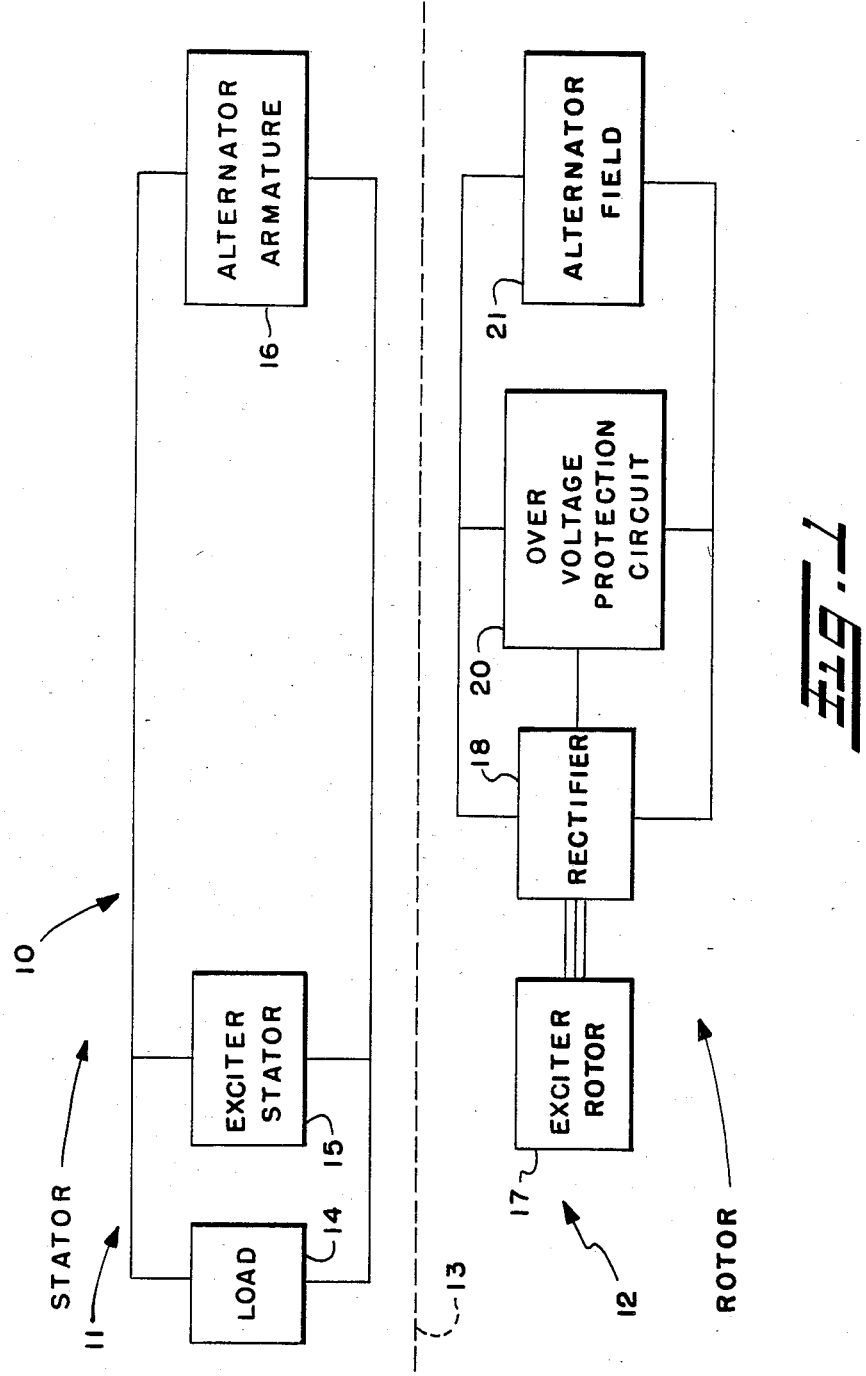

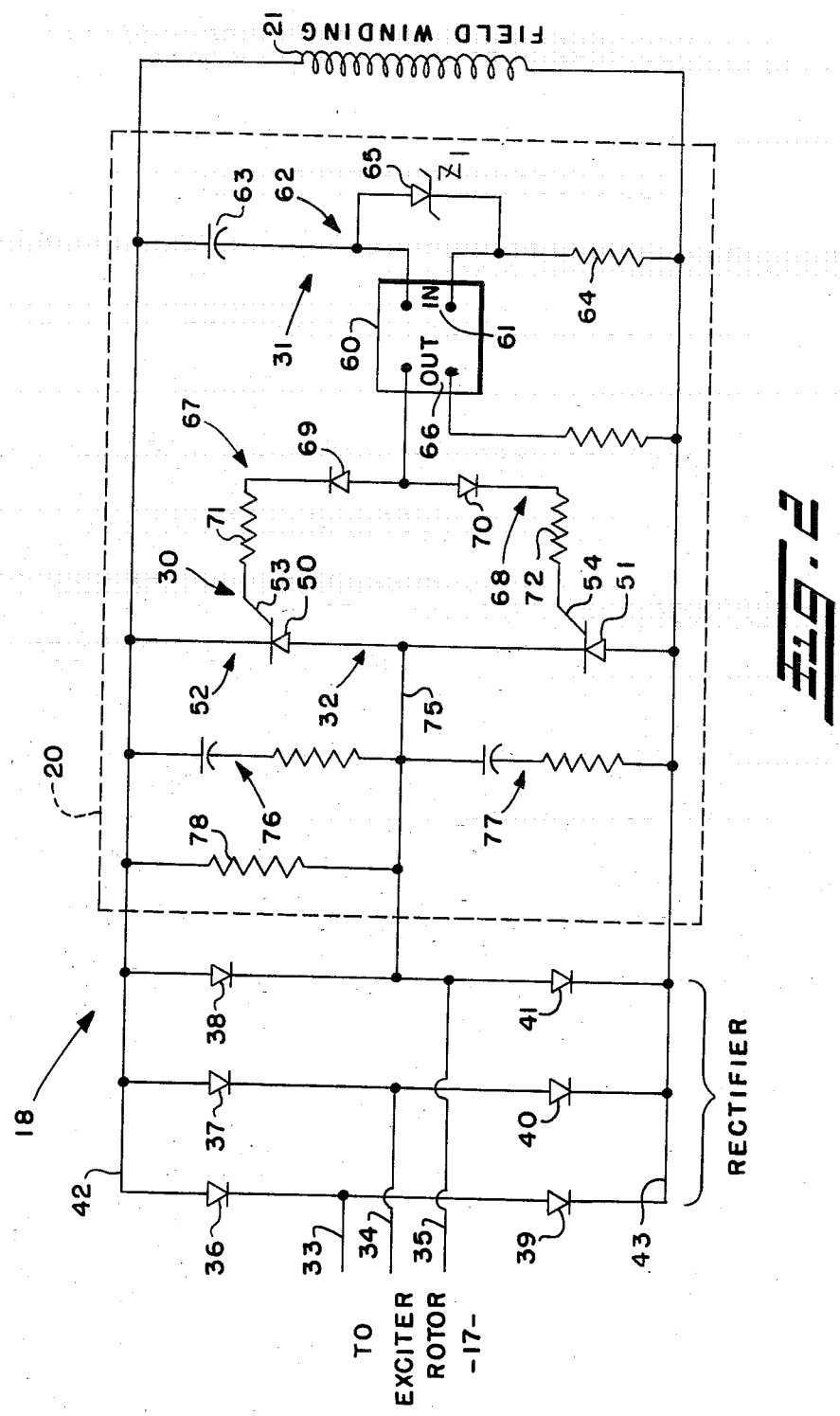

OVERVOLTAGE PROTECTION CIRCUIT FOR SYNCHRONOUS MACHINE ROTOR

TECHNICAL FIELD

The present invention relates generally, as indicated, to overvoltage protection devices and, more particularly, to an overvoltage protection circuit for a synchronous machine rotor. In the preferred embodiment and best mode, the invention protects the rotor-rectifier assembly of a brushless synchronous machine from excessive voltage during motor starting, alternator parallelling, etc.

BACKGROUND

An example of a synchronous machine with which the present invention may be used is disclosed in U.S. Pat. No. 3,210,644. Such a machine has exciter and alternator portions. Moreover, the machine includes relatively stationary and relatively movable portions usually referred to as exciter and alternator stators and exciter and alternator rotors. An AC signal is induced in the exciter rotor. The rotor also carries a rectifier, preferably a full wave rectifier, which rectifies the AC signal from the exciter and provides the same as a rectified signal input to the alternator rotor, which often also is referred to as the alternator field or alternator field winding. The rectified signal in the rotating field induces in the alternator stator (armature) an AC signal which typically may be used as the machine output and also may be used as an input to the exciter stator.

In such machines, especially those of the type that are brushless synchronous machines, it is desirable to minimize the number, size, and weight of the components included in the rotor while maximizing reliable operation of the machine.

Under certain conditions, an alternating or AC voltage may be induced in the field winding of a synchronous machine. Two common conditions causing such induced voltage are (1) when the machine is started as an induction motor and (2) when the machine is parallelled or synchronized with another power source. Due to a high turns ratio between the armature and field windings, the induced field voltage may be very high, for example several thousand volts or more. Since the induced voltage is an AC voltage, the diodes of the field rectifier, e.g. the full wave rectifier mentioned above, will be reverse biased during one-half of each cycle of the induced AC voltage. If the magnitude of such induced voltage exceeds the peak inverse voltage (PIV) rating of the diodes, the diodes could be damaged.

It is desirable to avoid such damage due to peak inverse voltage to the diodes or other rectifier means in the rotor of a brushless synchronous machine and in other devices as well; and the present invention is directed to an arrangement to provide such overvoltage protection.

SUMMARY

Briefly, in the present invention a low impedance bypass circuit is provided essentially to short circuit the inverse voltage induced in the field winding of a brushless synchronous machine, especially when the magnitude of such inverse voltage exceeds a predetermined level; and such low impedance bypass circuit is opened when a DC signal is supplied from the rectifier of the machine. The bypass circuit includes, for example, self-commutating triggerable switches, such as silicon controlled rectifiers (SCR's) or triacs which may be selectively triggered to conduction when the induced voltage is inverse relative to the rotor rectifier. The rotor rectifier, on the other hand, is conductive when such induced AC voltage is not inverse relative thereto. A voltage level sensor, for example a solid state relay, is used to sense the magnitude of the AC voltage induced in the field, and an input circuit to such relay is used to set the minimum shorting voltage, i.e. the voltage at which the relay will operate to effect triggering of the SCR's.

According to one aspect of the invention, then, an overvoltage protection circuit for a synchronous machine rotor includes a voltage level sensor for sensing the magnitude of at least one polarity of an AC signal in the rotor, a triggerable signal conducting circuit operable in a protecting mode to protect at least a portion of the rotor from a signal of excessive magnitude in response to sensing of such excessive magnitude by the voltage level sensor, the triggerable signal conducting circuit also having a stand-by mode for not affecting operation of the rotor, and a reset device for automatically resetting the triggerable signal conducting circuit from protecting mode to stand-by mode.

According to another aspect, the invention relates to a circuit for protecting the rotor-rectifier assembly of a brushless synchronous machine from excessive voltage, including a voltage level sensor for sensing the magnitude of one polarity of an AC voltage inverse to that ordinarily conducted by the rectifier of the rotor-rectifier assembly, a bypass circuit responsive to the voltage level sensor sensing an excessive magnitude of the AC inverse voltage for bypassing the same away from the rectifier, and a reset device for resetting the bypass circuit to stop such bypassing.

According to an additional aspect, the invention relates to a circuit for protecting a rectifier or the like from excessive inverse voltage, including a sensor for sensing occurrence of excessive inverse voltage and a bypass circuit responsive to the sensing of the excessive inverse voltage by the sensor for bypassing the excessive inverse voltage away from the rectifier.

These and other objects and aspects of the invention will become more apparent from the following description.

To the accomplishment of the foregoing and related ends, the invention, then, comprises the features hereinafter fully described in the specification and particularly pointed out in the claims. The following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a block diagram of a brushless synchronous machine employing the overvoltage protection circuit of the present invention; and FIG. 2 is a schematic electric circuit diagram of the overvoltage protection circuit of the invention coupled in the rotor of the brushless synchronous machine.

DESCRIPTION OF PREFERRED EMBODIMENT

Referring now in detail to the drawings, wherein like reference numerals designate like parts in the several figures, and initially to FIG. 1, a brushless synchronous machine 10 is illustrated schematically. The machine 10 includes a stator 11, and a rotor 12; a broken line 13 represents a separation between the stator and rotor. The stator 11 and rotor 12 are intended to undergo relative movement; in particular, the rotor 12 rotates, for example, within a generally cylindrical volume interiorly of the stator, which itself ordinarily remains relatively fixed with respect to the load 14. The machine 10 is intended to provide electrical power to operate the load 14.

The stator 11 includes an exciter stator 15 and an alternator armature 16. The rotor 12 includes an exciter rotor 17, a rectifier 18, which is preferably a full wave rectifier, the overvoltage protection circuit 20, which is described in greater detail below with respect to FIG. 2, and an alternator field or field winding 21. Summarizing operation of the machine 10, as the rotor 12 rotates relative to the stator 11, an AC electrical signal in the exciter stator 15 induces an AC electrical signal in the exciter rotor. The rectifier 18 rectifies the exciter rotor signal and, accordingly, provides a rectified, preferably a full wave rectified, signal input to the alternator field 21. As the alternator field 21 rotates with respect to the alternator armature 16, and with the alternator field so energized by the rectified signal, an AC electrical signal is induced in the alternator armature 16. Such alternator armature signal, then, is provided both to the exciter stator 15 and to the load 14 for operating the latter. An example of a typical load 14 would be an electric motor.

Under certain conditions, such as during starting of the machine 10 or when the machine 10 is parallelled or synchronized with another source, an AC voltage may be induced in the alternator field 21. Such induced voltage would be an AC voltage.

The overvoltage protection circuit 20 in accordance with the present invention is intended to prevent such induced AC voltage in the alternator field 21 from being applied to the rectifier 18 in such a way as to exceed the peak inverse voltage rating of the diodes or other rectifier type devices included in the rectifier 18 that could damage the same. The rectifier 18 is conductive when forward biased by one-half of each cycle of the induced voltage in the alternator field and during such forward biased conduction ordinarily would not be subject to damage, even by an excessive voltage level, since there is a minimum voltage drop in the rectifier elements, e.g. diodes, during conduction while forward biased. However, the overvoltage protection circuit 20 provides a low impedance bypass circuit for the voltage induced in the alternator field 21 when such induced voltage is inverse with respect to the rectifier 18, thereby preventing damage to the rectifier. During normal operation of the machine 10 in a so-called steady state mode, for example, the overvoltage protection circuit 20 remains effectively in a stand-by mode that does not have any effect on operation of the machine 10; upon the occurrence of an excessive voltage induced in the alternator field 21, especially if that voltage is inverse to the rectifier 18, the overvoltage protection circuit 20 is ready promptly to operate in protecting mode, as was summarized above and will be described in greater detail, now, with respect to FIG. 2.

Turning to FIG. 2, the overvoltage protection circuit 20 is shown in detail connected between the rectifier 18 and the field winding 21. The overvoltage protection circuit 20 includes a triggerable signal conducting circuit 30, which provides a low impedance bypass for excessive voltage induced in the field winding 21 that is inverse with respect to the rectifier 18; an overvoltage sensing circuit 31, which senses an excessive voltage induced in the field winding 21 and in response to such sensing effects triggering of the signal conducting circuit 30; and a reset mechanism generally designated 32, which effects resetting of the signal conducting circuit 30 after the latter has been triggered and the excessive inverse voltage that otherwise could be detrimental to the rectifier 18 has terminated.

For exemplary purposes, the machine 10 illustrated in FIG. 1 is a three-phase machine, and, accordingly, three leads 33, 34, 35 bring the respective phases from the exciter rotor 17 to the rectifier 18. (Principles of the invention may be used with single phase or greater than three phase machines, too, as will be appreciated by those having ordinary skill in the art.) The rectifier 18 includes six diodes 36–41 connected in the full wave rectifier configuration shown in FIG. 2; and the leads 33–35 are connected to junctions of respective pairs of diodes. It will be appreciated that the diodes in the rectifier 18 may be controlled rectifier devices, such as SCR's, triacs, or other devices capable of providing on the so-called positive and negative buses 42, 43 a full wave rectified signal for energizing the field winding 21 effectively for operation in the machine 10.

The triggerable signal conducting circuit 30 includes a pair of triggerable thyristors 50, 51 connected with each other in a series circuit 51 between the positive and negative buses 42, 43 and, in any event, generally in parallel with the rectifier 18 and field winding 21. Each of the thyristors 50, 51 preferably is an SCR that has a gate electrode 53, 54, respectively, on which a gate input signal may be received to trigger conduction in the SCR's when forward biased. Forward biasing of the SCR's 50, 51 would occur, as is evident from the schematic circuit diagram of FIG. 2, when reverse biasing by an inverse voltage is occurring at the rectifier 18, i.e. the bus 43 would be at a positive voltage level or potential with respect to the more negative bus 42. It will be appreciated that the triggerable thyristors 50, 51 may be other than SCR's; for example, triacs or other triggerable or switchable devices may be used to effect the desired bypassing of excessive voltage induced in the field winding 21 to prevent application of an excessive inverse voltage to the rectifier 18.

The overvoltage sensing circuit 31 includes a sensor generally designated 60 that has two distinct output states, one when the voltage to the input 61 is below a predetermined magnitude and a second when the voltage to the input 61 is above such predetermined magnitude. In the preferred embodiment and best mode the sensor 60 is a solid state relay, such as one sold by Motorola under Part No. MOC3031. Such solid state relay includes a zero voltage crossing optically isolated triac driver. Other solid state relays and/or like devices also may be used for the sensor 60 to provide the desired distinguishable outputs. The overvoltage sensing circuit 31 also includes an input circuit 62 which is coupled across the field winding 21 between the buses 42, 43 for providing an electrical input to the solid state relay 60 and to determine the actual magnitude or level of the induced voltage in the field winding 21 that would cause the solid state relay to produce an output that would provide gate input signals to the SCR's 50, 51 to effect conduction therein. The input circuit 62 includes a capacitor 63, resistor 64, and voltage limiting device 65, preferably a zener diode. The capacitor 63 and resistor 64 may be selected or, if desired, may even include adjustable components, for the purpose of determining the threshold voltage level at which the solid state relay 60 will supply a pulse or gate input signal to the gates 53, 54 of the SCR's 50, 51. The zener diode 65 provides two functions, including one of polarity sensitivity in that when the zener diode is forward biased inadequate voltage will be applied to the solid state relay input 61 and one of voltage limiting in that when the zener diode is reverse biased the same limits the maximum voltage applied to the solid state relay input 61. Forward biasing of the zener diode 65 and, thus, effective inactivity or stand-by operation of the solid state relay 60 and triggerable signal conducting circuit 30 occurring, will occur when the rectifier 18 is forward biased so that the latter is capable of then conducting any excessive induced voltage from the field winding 21. Reverse biasing of the zener diode 65 will occur when the rectifier 18 also is reverse biased; and this will enable the solid state relay 60 to effect triggering of the triggerable signal conducting circuit 30 to provide a low impedance bypass circuit for the inverse voltage signal, i.e. with respect to the rectifier 18, induced in the field winding 21.

The output 66 from the solid state relay 60 is connected by a pair of gate or trigger circuits 67, 68, each including a diode 69, 70 and a resistor 71, 72, respectively, for providing gate input signals to the gate terminals 53, 54 of the SCR's 50, 51.

The overvoltage protection circuit 20 ordinarily is in a stand-by mode having no effect on the full wave rectified signal applied by the rectifier 18 to the buses 42, 43 across the field winding 21, this being due, for example, to the blocking effect of the capacitor 63, the conducting effect of the zener diode 65, and/or the reverse biasing of the SCR's 50, 51. However, in the event there is induced in the field winding 21 a voltage of a polarity that reverse biases the diodes in the rectifier 18 and is of a magnitude that exceeds the peak inverse voltage of the diodes in the rectifier 18, the overvoltage protection circuit 20 operates to provide a low impedance bypass for such excessive induced voltage. Such induced voltage occurring during starting or parallelling of the machine 10 ordinarily could be expected to be relatively large in view of the larger turns ratio between the alternator armature and the field winding 21. Such induced voltage would be an AC voltage.

When such induced voltage is negative, i.e. the bus 42 is relatively negative with respect to the bus 43, a voltage develops across the zener diode 65 at a rate determined by the time constant of the input circuit 62 and is applied to the input 61 of the solid state relay 60 causing the latter to complete a circuit coupling the positive signal from the bus 43 through the gate circuits 67, 68 as gate input signals to the SCR's 50, 51. The SCR's 50, 51 then also are forward biased and become triggered to conduction. Thus, the SCR's 51, 52 provide a bypass circuit for such voltage that is inverse to the rectifier 18.

When the induced voltage in the field winding 21 reverses polarity, the SCR's 50, 51 are reverse biased and automatically are commutated to a non-conductive stand-by condition. The positive induced voltage in the field winding 21, though, can be conducted by the diodes in the rectifier 18, which then are forward biased.

If the exciter rotor 17 becomes energized to provide a voltage exceeding that of the induced voltage in the field or when such induced voltage has terminated while the SCR's 50, 51 still are conductive, the SCR's 50, 51 conduct the DC current output of the rectifier 18 and undesirably short out the field winding 21. However, this condition can remain only for one cycle of the exciter voltage since the SCR's will be commutated off by the reverse polarity of the exciter voltage provided on line 75. After the SCR's are turned off, they cannot be turned back on by the exciter rectifier system since the voltage thereof is below the threshold voltage of the input circuit 62 and solid state relay 60. The resistor and capacitor circuits 76, 77 and resistor 78 coupled relative to the SCR's are operable in conventional manner, for example, to prevent triggering of the SCR's 50, 51 by noise pulses or transients, to facilitate commutation, etc.

The overvoltage protection circuit 20 can be operated repeatedly for field induced voltage surges, which is not possible with conventional metal oxide surge suppressors used in the past to protect power semiconductors from voltage transients. The invention also can sustain this fault condition of excessive induced voltage in the field winding 21, for example, for many seconds; whereas conventional metal oxide surge suppressors are generally applicable for voltage transients of one millisecond or less.

Whether the diodes in the rectifier 18 are forward biased during normal operation or bypassed via the SCR's 50, 51, the same encounter only a relatively low voltage of, for example, approximately two volts across the same; and, therefore, the machine 10 employing the overvoltage protection circuit 20 has substantial reliability and is not subject to prior rectifier burn-out problems. Although the SCR's 50, 51 must be relatively large and capable of carrying the induced short circuit current for short time periods, such current is relatively low since the armature-field coupled circuit acts as a step-down current transformer. However, the other components included in the overvoltage protection circuit 20 are not subjected to large voltages or currents; indeed they can be relatively low signal devices and, therefore, relatively small in size, low in cost, and convenient for circuit integration.

STATEMENT OF INDUSTRIAL APPLICATION

In view of the foregoing it will be appreciated that the overvoltage protection circuit in accordance with the present invention may be employed to protect the rotor-rectifier assembly of a brushless synchronous machine.

I claim:

1. A brushless synchronous machine, comprising an exciter stator, an alternator stator, an exciter rotor and an alternator rotor, said rotors being rotatably relative to said stators, and an overvoltage protection circuit for the rotor of such machine, including voltage level sensing means for sensing the magnitude of at least one polarity of an AC signal in such rotor, triggerable signal conducting means operable in a protecting mode to protect at least a portion of such rotor from a signal of excessive magnitude in response to sensing of such excessive magnitude by said voltage level sensing means, said triggerable signal conducting means also having a stand-by mode for not affecting operation of such rotor and being automatically capable of resetting from protecting mode to stand-by mode, said voltage level sensing means comprising a solid state relay, a resistor and capacitor input circuit means for determining the excessive voltage level required to effect operation of said solid state relay to cause said triggerable signal conducting means to operate in such protecting mode, and polarity sensitive means coupled in said input circuit means for allowing said solid state relay to sense the magnitude of only one polarity of such AC signal and for limiting the maximum voltage of such AC signal applied to said solid state relay.

2. A brushless synchronous machine, comprising a stator, including an alternator armature and an exciter primary; a rotor-rectifier assembly, including an exciter secondary, an alternator field, and a rectifier for electrically coupling said exciter secondary and said alternator field; said rotor being rotatable relative to said stator; and a circuit for protecting the rotor-rectifier assembly, including voltage level sensing means for sensing the magnitude of one polarity of an AC voltage inverse to that ordinarily conducted by the rectifier of such rotor-rectifier assembly, bypass means responsive to said voltage level sensing means sensing an excessive magnitude of such AC inverse voltage for bapassing the same from said rectifier and being resettable to stop such bypassing, said voltage level sensing means comprising an input circuit coupled to receive such AC voltage, and voltage limiting means for limiting the maximum voltage of such AC voltage applied to said voltage level sensing means.

3. An overvoltage protection circuit for a synchronous machine rotor, comprising
voltage level sensing means for sensing the magnitude of at least one polarity of an AC signal in such rotor,
triggerable signal conducting means operable in a protecting mode to protect at least a portion of such rotor from a signal of excessive magnitude in response to sensing of such excessive magnitude by said voltage level sensing means, said triggerable signal conducting means also having a stand-by mode for not affecting operation of such rotor and being automatically capable of resetting from protecting mode to stand-by mode,
said voltage level sensing means comprising a solid state relay, a resistor and capacitor input circuit means for determining the excessive voltage level required to effect operation of said solid state relay to cause said triggerable signal conducting means to operate in such protecting mode, and polarity sensitive means coupled in said input circuit means for allowing said soliid state relay to sense the magnitude of only one polarity of such AC signal and for limiting the maximum voltage of such AC signal applied to said solid state relay.

4. The invention of claim 3, said solid state relay having a pair of input terminals, and said polarity sensitive means comprising a zener diode connected between said input terminals.

5. The invention of claim 3, said triggerable signal conducting means comprising an SCR.

6. The invention of claim 3, said triggerable signal conducting means comprising thyristor means responsive to a gate input signal to assume conduction therein as such protecting mode.

7. The invention of claim 6, said voltage level sensing means including output means for delivering such a gate input signal to said thyristor means upon sensing an AC signal of excessive magnitude.

8. The invention of claim 3, such rotor comprising a field winding and a rectifier means for applying a rectified voltage to said field winding during ordinary operation of such machine, and said triggerable signal conducting means being coupled across said rectifier means to bypass any inverse excessive voltage induced in said field winding from being applied as an excessive inverse voltage to said rectifier means.

9. The invention of claim 8, said rectifier means comprising a full wave rectifier, said triggerable signal conducting means comprising two triggerable thyristors coupled in a series circuit with each other and said series circuit being coupled across said full wave rectifier.

10. The invention of claim 8, wherein when forward biased said rectifier means is conductive with respect to such excessive voltage induced in said field winding.

11. The invention of claim 9, said voltage level sensing means comprising means for applying gating signals to said thyristors to effect conduction therein upon sensing an excessive magnitude of such AC signal.

12. The invention of claim 9, further comprising a connection from the input of said full wave rectifier to a location in said series circuit between said thyristors.

13. The invention of claim 9, wherein said thyristors are connected across said field winding to receive inverse voltage from the latter for commutating said thyristors.

14. The invention of claim 11, wherein both of said input circuit means and solid state relay are coupled across said field winding to sense an excessive voltage therein, and said solid state relay having an output means for producing gating signals for application to said thyristors when excessive voltage of said one polarity is sensed.

15. The invention of claim 14, said polarity sensitive means comprising a zener diode.

16. The invention of claim 3, such rotor comprising a rotor-rectifier assembly of a brushless synchronous machine, said voltage level sensing means comprising means for sensing the magnitude of one polarity of an AC voltage inverse to that ordinarily conducted by the rectifier of such rotor-rectifier assembly, and said triggerable signal conducting means comprising bypass means responsive to said voltage level sensing means sensing an excessive magnitude of such AC inverse voltage for bypassing the same away from such rectifier.

17. The invention of claim 3, said input circuit means being coupled to receive such AC signal.

18. The invention of claim 17, said polarity sensitive means comprising a zener diode.

19. A circuit for protecting the rotor-rectifier assembly of a brushless synchronous machine from excessive voltage, comprising
voltage level sensing means for sensing the magnitude of one polarity of an AC voltage inverse to that ordinarily conducted by the rectifier of such rotor-rectifier assembly, and
bypass means responsive to said voltage level sensing means sensing an excessive magnitude of such AC inverse voltage for bapassing the same from said rectifier and being resettable to stop such bypassing,
said voltage level sensing means comprising an input circuit coupled to receive such AC voltage, and voltage limiting means for limiting the maximum voltage of such AC voltage applied to said voltage level sensing means.

20. The invention of claim 19, said bypass means comprising thyristor means responsive to a gate input signal to assume conduction therein, said thyristor means being coupled in parallel circuit relation across said rectifier.

21. The invention of claim 20, said rectifier comprising a full wave rectifier having plural rectifier devices, and said thyristor means comprising two thyristors connected in a series circuit, and connecting means for connecting a pair of said rectifier devices of said full wave rectifier with a location in said series circuit between said thyristors.

22. The invention of claim 20, said voltage level sensing means including output means for delivering such a gate input signal to said thyristor means upon sensing an AC voltage of excessive magnitude.

23. The invention of claim 20, such rotor-rectifier assembly comprising a field winding and said rectifier being coupled with respect to said field winding for applying a rectified voltage to said field winding during ordinary operation of such machine, and said thyristor means being coupled across said rectifier to bypass any inverse excessive voltage induced in said field winding from being applied as an excessive inverse voltage to said rectifier, and wherein when forward biased said rectifier is conductive with respect to such excessive voltage induced in said field winding.

24. The invention of claim 23, said thyristor means being coupled with respect to said field winding for commutating said thyristor means in response to a polarity change of the induced voltage in said field winding, and connection means for connecting said thyristor means to said rectifier, whereby upon reversal of polarity of the input to said rectifier the same commutates said thyristor means to non-conduction.

25. The invention of claim 19, said thyristor means comprising silicon controlled rectifiers.

26. The invention of claim 19, said voltage level sensing means comprising a solid state relay and means for determining the voltage input required to said solid state relay to cause a change in output thereof.

27. The invention of claim 19, said voltage level sensing means comprising a solid state relay.

28. The invention of claim 19, said voltage level sensing means comprising an input circuit coupled to receive such AC voltage, and polarity sensitive means coupled in said input circuit for allowing said voltage level sensing means to sense the magnitude of only one polarity of such AC voltage.

29. The invention of claim 28, said polarity sensitive means comprising a zener diode.

30. The invention of claim 29, said voltage level sensing means comprising a solid state relay means for producing an output that causes said bypass means to effect such bypassing when such AC inverse voltage exceeds a predetermined magnitude.

31. The invention of claim 19, said voltage limiting means comprising a zener diode.

32. The invention of claim 31, said voltage level sensing means comprising a solid state relay means for producing an output that causes said bypass means to effect such bypassing when such AC inverse voltage exceeds a predetermined magnitude.

* * * * *